United States Patent
Smith

(10) Patent No.: US 7,152,037 B2
(45) Date of Patent: Dec. 19, 2006

(54) SYSTEM, METHOD AND COMPUTER PROGRAM PRODUCT FOR FACILITATING REAL ESTATE TRANSACTIONS

(76) Inventor: Jeffrey C. Smith, 7878 Pale Moon Ct., Fairhope, AL (US) 36532

( * ) Notice: Subject to any disclaimer, the term of this patent is extended or adjusted under 35 U.S.C. 154(b) by 74 days.

(21) Appl. No.: 10/890,548

(22) Filed: Jul. 13, 2004

(65) Prior Publication Data

US 2005/0240426 A1    Oct. 27, 2005

Related U.S. Application Data

(60) Provisional application No. 60/565,554, filed on Apr. 27, 2004.

(51) Int. Cl.
G06F 17/60 (2006.01)

(52) U.S. Cl. .............................. 705/1; 705/26; 705/35

(58) Field of Classification Search .................. 707/1, 707/35, 26
See application file for complete search history.

(56) References Cited

U.S. PATENT DOCUMENTS

| | | | |
|---|---|---|---|
| 6,594,633 | B1 | 7/2003 | Broerman |
| 6,678,663 | B1 | 1/2004 | Mayo |
| 7,024,397 | B1 * | 4/2006 | Donahue ............ 705/80 |
| 2002/0042770 | A1 | 4/2002 | Slyke et al. |
| 2002/0046038 | A1 | 4/2002 | Prokoski |
| 2002/0046065 | A1 | 4/2002 | Nighan |
| 2002/0052814 | A1 * | 5/2002 | Ketterer ............ 705/35 |
| 2002/0065739 | A1 | 5/2002 | Florance et al. |
| 2002/0095346 | A1 | 7/2002 | Liss |
| 2002/0107764 | A1 | 8/2002 | McCoy |
| 2002/0198801 | A1 | 12/2002 | Dixon et al. |
| 2003/0036963 | A1 | 2/2003 | Jacobson et al. |
| 2003/0187756 | A1 | 10/2003 | Klivington et al. |
| 2003/0229649 | A1 | 12/2003 | Herrero |
| 2004/0030616 | A1 | 2/2004 | Florance et al. |
| 2004/0030631 | A1 | 2/2004 | Brown et al. |
| 2004/0054606 | A1 | 3/2004 | Broerman |
| 2005/0177488 | A1 | 8/2005 | Rexrode |

FOREIGN PATENT DOCUMENTS

| | | | |
|---|---|---|---|
| EP | 952536 A1 | * | 10/1999 |
| GB | 2 382 687 A | | 6/2003 |

OTHER PUBLICATIONS

Sample of Real Estate Contract from Long & Foster Realtors labeled as L&F, 2000-2003.*

(Continued)

*Primary Examiner*—Naresh Vig
(74) *Attorney, Agent, or Firm*—Alston & Bird LLP

(57) ABSTRACT

A method for facilitating a real estate transaction includes engaging an initiating party in communication with an initiated party regarding a property, where the parties are engaged for an engagement period. In this regard, the initiating party can be a buyer arrangement or a seller arrangement, with the initiated party being the other of the buyer arrangement and the seller arrangement. Thereafter, the engaged parties are restricted from communicating with other buyer arrangements and seller arrangements during the engagement period. Restricting the parties thereby facilitates the parties concluding a real estate transaction regarding the property. In addition, the method can further include insuring the buyer arrangement for a period of time against a loss of income due to a default of at least one tenant if the parties conclude a real estate transaction regarding an income-producing property including at least one tenant.

29 Claims, 18 Drawing Sheets

OTHER PUBLICATIONS

National Real Estate Exchange Network; 29 pages; available at <http://www.1031commercialproperties.com> (visited Apr. 20, 2004).

*A Business Owner's Guide to Property and General Liability Insurance*; Real Estate Leasing Tips; The Center for Commercial Real Estate; 10 pages; available at <http://www.centerforcommercialrealestate.com/newsletter/insurance.htm> (visited Apr. 22, 2004).

The Citadel: InfoWorld: Commercial Lines: Coverage for Real Estate; 5 pages; available at http://www.citadel.ca/english/info/ibusiness/irealty/irealty.htm> (visited Apr. 22, 2004).

* cited by examiner

FACILITATOR SERVICE

FACILITATOR

Retail Sellers
Apartment Sellers
Sale Leasebacks
Office Sellers
Tenant Default
Buyer Protection
Realtor Participation
Seller Explanation
Buyer Explanation
Qualifications
Seller Signup
Buyer Signup 1031 Exchange
Public Forum TIC
Investor Forum Contact Info:

Facilitator
(555) 555-5555
service@service.net

Assistant 1
(555) 555-5555
assist1@service.net

Assistant 2
(555) 555-5555
assist2@service.net

---

UNIQUE - CONFIDENTIAL - PROACTIVE COMMERCIAL REAL PROPERTY ACQUISITION & DISPOSITION SYSTEM

| Nationwide Qualified Buyers | | Nationwide Qualified Sellers |

AN EVOLUTION OF PROCESS:

A BETTER, SAFER MORE COMMON SENSE METHOD FOR BUYERS AND SELLERS TO INTERACT.

THE NEW COMMERCIAL MODEL
FACILITATOR'S SERVICE is a dynamic new commercial real estate exchange model that aligns buyer with seller through an innovative, secure, effective, high-tech system of confidential information exchange *without* the expense and obligation of the listing/marketing process.

INCREASED SUPPLY
FACILITATOR scientifically targets specific properties in specific markets that possess certain advantages and identifies their individual purchase parameters and confidentially mass markets those parameters thereby increasing the supply of properties to the commercial real estate buyer by enabling more properties to enter the market.

INCREASED DEMAND
FACILITATOR increases Buyer demand through the industry's first: TENANT DEFAULT BUYER PROTECTION PROGRAM giving the buyer incredible piece of mind by insuring their net returns and allowing more buyers to enter the marketplace.

INCREASED BUYER AVTIVITY
FACILITATOR creates the perfect atmosphere for buyer and Seller. Buyers get great data on properties that are NOT offered through a shopped over bidding environment and Buyers have the unique opportunity to quickly lock in a property giving the buyer and seller an exclusive one on one time period to peacefully and profitably construct a contract.

QUALITY BEFORE QUANTITY
FACILITATOR maintains a database of qualified, screened confidential retail properties maintaining up to date data on NOI, tenant roster, ownership contacts and selling parameters. These properties are not publicly for sale, but *are available* for sale the parameters of which are enclosed and available with non-disclosure exchange.

QUALIFIED PARTICIPANTS
FACILITATOR daily communicates with qualified buying and selling entities emailing confidential property briefs and putting buyer and seller in communication after confidentiality agreements are mutually exchanged.

MORE COST EFFECTIVE & EASIER TO USE
FACILITATOR allows buyer and Seller direct contract with each with assistance available from an experienced broker, a professional facilitator, without central control by a broker. The RIISNET system is offered turn key, many closing costs are free to both parties, website presence is free of charge, either party may withdraw at any time without penalty and either Buyer or Seller may purchase without paying commission.

And also a traditional Public Forum:
FACILITATOR has an exclusive agreement to market select property briefs to pre-qualified Acquisition Entities by regulating a confidential information exchange through password protected website data transfer.

FIG. 5.

FACILITATOR SERVICE

*What if There was a Way to:*
Expose your property Very Confidentially to numerous
Buyers Nationwide, who routinely purchase your property type.
After mutual processing of a Non-Disclosure Agreement:
Buyers Get rent rolls, NOI, aerials, demographic mapping
and a radius based competition report with tenant mix
and sales of similar properties within a 50 mile radius

*Think of it!*
Immediate, confidential <u>direct</u> access to pre-qualified Buyers with assistance from a professional broker, not interference. No restrictive contracts, no road blocks to negotiations, no long lead times on responses to your inquiries and an environment that is far less litigious since you get uninterrupted personal access to a Buyer that has agreed to not look at any of our other properties until your mutual five day engagement period expires. You both have the time and opportunity to construct a deal with or without the assistance of a professional broker.

Property Program

A Buyer Simply clicks the info button below your box and up will come a non-disclosure, non-circumvent, agreement in which the initiating party agrees to pay Facilitator a small percentage fee only payable if the two parties consummate an agreement the fee to be paid from proceeds at closing. The vast majority of the time the Buyer will initiate the agreement and contact you directly once you approve their non-disclosure agreement we forwarded to you, however you have to opportunity to proactively engage any of our Buyers.

Buyers embrace Facilitator's Service for several reasons. Having the ability to enter into private negotiations with a property they have thoroughly analyzed prior to initial Seller contact and gaining access to properties that are not shopped over by numerous buyers sets up a much more positive buying environment.

With Facilitator, only serious parties engage each other as their access to other parties is limited during the engagement process.

The Buyer initiated non-disclosure agreement when received by Facilitator is forwarded to the Seller for signature acceptance at which time a password is forwarded to the Buyer which opens up the appropriate folder full of our pre-prepared data including but not limited to:

Aerial, Photo, Rent Roll, NOI, Cap Rate, Financing Package,
Cash on Cash Projection, Cash Flow Projection, Comps by Radius,
Competition Report with Tenant Mix and Local Trend Report
&
SITE SPECIFIC MAPPING OF:
Income, Population, Consumer Expenditure, Retail Sales Potential, & Crime.

Buyer and Seller information are then temporarily locked from further outside access for five days giving both parties the time, peace of mind and opportunity to enter into a contract to finish due diligence with each other. Approved Party Contracts, LOI's, 1031 Intermediaries, Title Companies and Agency Forms are all available for either party through Facilitator's Service if you need them.

Buyer and Seller information is consistently updated for accuracy, and new entries are emailed out to parties that have requested that specific information on requested property

[Acquisition Entities]  [Seller Sign Up]

FIG. 6.

FACILITATOR SERVICE

What if There was a Way to:
Get an *exclusive* look at available Commercial Real Properties
That are in the path of growth and have supporting incomes & traffic!
Get rent rolls, NOI, aerials, demographic mapping!
Get a radius based competition report with tenant mix!
And get current sales comps of similar properties within a 50 mile radius!

ON PROPERTIES THAT ARE AVAILABLE
BUT NOT PUBLICLY SHOPPED, MASS ADVERTISED
OR OFFERED IN A BIDDING ENVIRONMENT

Think of it!
Good data on pre-screened properties, immediate <u>direct</u> access to the Seller with assistance from a professional broker, not interference. No restrictive contracts, no road blocks to negotiations, no long lead times on responses to your inquiries and an environment that is far less litigious since you get to do your own assisted due diligence thru uninterrupted personal access to a Seller that has agreed to not to engage our other Buyers until your mutual five day engagement period expires.

Acquisition Program

Simply click property info button below each property and up will come a non-disclosure, non-circumvent, agreement in which the initiating party agrees to pay Facilitator a small percentage fee only payable should you consummate an agreement with one of our featured properties, and paid at closing to a local broker. Once initiated, as a Buyer you have access to all our available, confidential, properties though out the county and have the ability to list your buying parameters on Facilitator's Service FREE OF CHARGE, giving hundreds of Sellers direct access to You!

Sellers embrace Facilitator's Service for several reasons. Retailers and Apartment Owners get to feature their properties to hundreds of Buyers nationwide, without having to list with a specific entity for an extended period of time, without having their tenants, competitors or nuisance inquiries knowing their business. Mass marketing without the negative exposure.

With Facilitator, only serious parties engage each other as their access to other parties is limited during the engagement process.

The agreement when received by Facilitator is forwarded to the Seller for signature and then a password is forwarded to the Buyer which opens up the appropriate folder full of pertinent data including but not limited to:

Aerial, Photo, Rent Roll, NOI, Cap Rate, Financing Package,
Cash on Cash Projection, Cash Flow Projection, Comps by Radius,
Competition Report with Tenant Mix and Local Trend Report
&
SITE SPECIFIC MAPPING OF:
Income, Population, Consumer Expenditure, Retail Sales Potential, & Crime.

Buyer and Seller information is then locked from further outside access for five days giving both parties the time, peace of mind and opportunity to enter into a contract to finish due diligence with each other. Approved Party Contracts, LOI's, 1031 Intermediaries, Title Companies and Agency Forms are all available for either party through Facilitator if you need them.

Buyer and Seller information is updated monthly for accuracy, and new entries are emailed out to parties that have requested that specific information on requested property types.

| Available Properties | Buyer Qualifications |
| Realtor Participation | Acquisition Entity Sign Up |

FIG. 7.

FACILITATOR SERVICE

PROGRAM QUALIFICATIONS

Facilitator's service is a unique Commercial Real Estate acquisition and disposition model that focuses on the needs of today's buyer and seller by streamlining the sales process utilizing the best of the traditional marketplace model and eliminating the factors that hinder both buyer and seller.

Facilitator's service is the new model for the serious participant. Buyers and Sellers are registered contenders ready, willing and able to perform if the deal is real. Service participants are the heart beat of the Commercial Real Estate Industry.

Due to the fact that Buyer and Seller are offering to exchange specific information with each other and engage each other exclusively for a brief limited time period, both parties must be qualified participants.

SELLER QUALIFICATIONS

Facilitator spends considerable time and expense thoroughly evaluating each and every property featured by Facilitator. Available properties are not idle, outdated or misrepresented listings. Available properties are available, recently confirmed and thoroughly evaluated. Facilitator supplies our Buyers with some of the most comprehensive pre-screened data in the industry.

The Seller must fully comply with the Facilitator confirmation or correction process. The Seller must supply all required information but in turn fully controls the release of that data by approving the engagement of any Buyer prior authorizing Facilitator to release the data to each specific Buyer. All data supplied to Facilitator will be verified by Facilitator. Each property will be mapped out with consumer expenditures, traffic and incomes as well as be coupled with a thorough competition report so each Buyer will quickly understand the viability price-risk relationship of that property. Each Seller must agree to negotiate in good faith with a qualified ready willing and able Buyer.

BUYER QUALIFICATIONS

Today's market is one in which demand exceeds supply. Supply however is considerably less limited through the advent of Facilitator's service due the confidentiality nature and streamlined process of Facilitator. Many of the restrictions imposed upon the Seller are alleviated through Facilitator's service.

Buyers although plentiful are the driving force in today's commercial real estate market and as a result are vital to Facilitator's service. Buyers must be legitimate, qualified and registered on Facilitator's website. Buyers must have a proven history of purchasing featured property types and supply details of such. Only registered Buyers will be able to engage a Seller. Sellers have the ability to preview Buyer qualifications prior to the Buyer being able to engage the Seller. This is done via our non-disclosure processing/approval stage which is normally completed within minutes or hours of the buyer's request for information.

As a result the Buyer has the luxury of previewing and getting an exclusive look at our supply of available properties in a much more enjoyable and positive environment.

FIG. 8.

Facilitator Sales Model Confidential Signup

I am forwarding the following information to Facilitator with the strict understanding that I may revoke* the enclosed information from the Facilitator's Website & System at any time. The following information is forwarded in two categories – confidential and non-confidential property brief information. The confidential information is not to be released to any third party unless written approval is given by those I authorize below.

The forwarding of this information to Facilitator is in conjunction with and subsequent to my signature approval of the Facilitator Non- Circumvent agreement.

| |
|---|
| Price Range: $; 1-5 million, $$: 5-10 million, $$$: 10-15 million, $$$$: 15-20 million, $$$$$: 20+ million |
| Cap Rate: A: All B: 9+, C: 8+, E: 7+, F: 6+ |
| Property Types: SA -Stand Alone, NC - Neighborhood Center, CC– Community Center, RC– Regional Center, SR - Super Regional, SC - Shadow Center, GA- Grocery Anchored Center; DP-      Distressed Property, LC- Lifestyle Center, GAP - Garden Apartment, HAP High Rise Apartment. |
| Expense Responsibility: N-Net leased taxes Tenant paid, NN-Taxes & Insurance paid, NNN-Taxes,      Insurance, Repairs & Maintenance paid, Abs NNN– all expenses paid by tenant |

Non-Confidential Property Brief Info:

Price Range: [   ]   Cap: [   ]   Prop Type: [   ]   Expense: [   ]   Region: [   ]

Confidential Property Info (Bound by Non-Disclosure):

Property Address: _____, State: _____, Zip:_____

Existing NOI: $_____, Percentage Occupancy: _____%, Historic Vacancy %_____

Property Size: _____# of Parking:_____.

Remarks:    _____
_____.

Contact name:_____ Phone: _____

Email: _____ Fax:_____

Person(s) authorized to release confidential information: _____
_____.

Brokerage: I _____ am a licensed Realtor in the state of _____ and have the above property listed for ____ %. I hereby register the above names Seller as my client and am willing to receive as compensation ½ the Facilitator facilitation fee less my commission amount.

I also would like to: ____ Purchase _____ Exchange. Please call: _____.

Email form to: assist1@service.net or Fax form to: 555-555-5555 Questions: service@service.net

* revocation: Seller agrees that Facilitator is due a full 4% fee is seller sells to a Facilitator listed Buyer any seller owned properties that seller engaged or rejected while seller's property was listed on Facilitator for a period of 24 months following sellers revocation of property on Facilitator.

FIG. 9.

Facilitator Acquisition Model Confidential Signup

I am forwarding the following information to Facilitator with the strict understanding that I may revoke* the enclosed information from the Facilitator's Website & System at any time. The following information is forwarded in two categories – confidential and non-confidential property brief information. The confidential information is not to be released to any third party unless written approval is given by those I authorize below.

The forwarding of this information to Facilitator is in conjunction with and subsequent to my signature approval of the Facilitator Non- Circumvent agreement.

---
Price Range:     $; 1-5 million, $$: 5-10 million, $$$: 10-15 million, $$$$: 15-20 million, $$$$$: 20+ million
Cap Rate:        A: All  B: 9+, C: 8+,  E: 7+, F: 6+
Property Types: SA -Stand Alone, NC - Neighborhood Center, CC– Community Center, RC– Regional   Center,   SR  - Super Regional, SC - Shadow Center, GA- Grocery Anchored Center; DP-         Distressed  Property, LC- Lifestyle Center, GAP - Garden Apartment, HAP High Rise Apartment.
Expense Responsibility: N-Net leased taxes Tenant paid, NN-Taxes & Insurance paid, NNN-Taxes,       Insurance, Repairs & Maintenance paid, Abs NNN– all expenses paid by tenant

---

Non-Confidential Purchaser Brief Info:

Price Range: [   ]    Cap: [   ]    Prop Type: [   ]    Expense: [   ]    Region: [   ]

# of Properties bought last year: [   ]

Confidential Purchaser Info (Bound by Non-Disclosure):

Remarks: _____

_____

Contact name: _____  Phone: _____

Email: _____  Fax: _____

Person(s) authorized to release confidential information: _____

_____

Brokerage: I _____ am a licensed Realtor in the state of _____ and have the above property listed for ____ %. I hereby register the above named Buyer as my client and am willing to receive as compensation ½ the Facilitator facilitation fee less my commission amount.

I have also have property to: ____ Sell ____ Exchange Please call: _____.

Email form to: assist1@service.net or Fax form to: 555-555-5555 Questions: service@service.net

* revocation: Buyer agrees that Facilitator is due a full 4% fee is Buyer buys any a Facilitator listed properties for which that buyer was engaged or rejected while that property or other owned Sellers property was listed on Facilitator, for a period of 24 months following buyer's revocation of buyer information on Facilitator. Buyer additionally agrees that Buyer will pay Facilitator a 2% commission if buyer purchases and other seller owned properties in which buyer engaged or was engaged buy a Facilitator listed Seller for a period of one year after Buyer withdraws or revokes their buyer information from the Facilitator website/system.

FIG. 10.

FACILITATOR SERVICE

| SERVICE | ACQUISITION ENTITIES |
|---|---|
| Have Nation-wide Seller's Find You! BUYER CONFIDENTIAL SIGN UP *It's Free!* | Price Range: $: 1-5 million, $$: 5-10 million, $$$: 10-15 million, $$$$: 15-20 million, $$$$$: 20+ million<br>Cap Rate: A: All  B: 9+, C: 8+, E: 7+, F: 6+<br>Property Types: SA - Stand Alone, NC - Neighborhood Center, CC - Community Center, RC - Regional Center, SR - Super Regional, SC - Shadow Center, GA - Grocery Anchored Center, DP - Distressed Property, LC - Lifestyle Center, GAP - Garden Apartment, HAP - High Rise Apartment.<br>Expense Responsibility: N-Net leased taxes Tenant paid, NN-Taxes & Insurance paid, NNN-Taxes, Insurance, Repairs & Maintenance paid, Abs NNN- all expenses paid by tenant<br>Region: US- Full USA, SE - Southeast, SW - Southwest, NE - Northeast, NW - Northwest, C - Central, E - East, W - West, G - Global |

| FACILITATOR SERVICE Program Explanation | View Nationwide Properties |

QUALIFIED - EXPERIENCED - REGISTERED PREMIER - BUYERS

1031 Exchange
Exchange Properties

Contact Info:

| Purchases L/Y: 1<br>Price Range: $$$$$<br>Region: US<br>Cap: A<br>Type: SR<br>Remarks:<br>*Contact Buyer* | Purchases L/Y: 6<br>Price Range: $$$ - $$$$<br>Region: US<br>Cap: B<br>Type: NC, SR, RC<br>Remarks: keep exist mgmt<br>*Contact Buyer* |
|---|---|

Facilitator
(555) 555-5555
service@service.net

| Purchases L/Y: 7<br>Price Range: $ - $$<br>Region: SE<br>Cap: B<br>Type: CC, SA, GAP<br>Remarks:<br>*Contact Buyer* | Purchases L/Y: 3<br>Price Range: $ - $$$$<br>Region: US<br>Cap: A<br>Type: NC, SA, SR, RC,<br>Remarks:<br>*Contact Buyer* |
|---|---|

Assistant 1
(555) 555-5555
assist1@service.net

| Purchases L/Y: 6<br>Price Range: $ - $$<br>Region: SW<br>Cap: B<br>Type: CC, SC, GAP<br>Remark: ENGAGED<br>*Contact Buyer* | Purchases L/Y: 2<br>Price Range: $$ - $$$$<br>Region: SE<br>Cap: A<br>Type: RC, CC, SA<br>Remarks: aggressive, quick close<br>*Contact Buyer* |
|---|---|

Assistant 2
(555) 555-5555
assist2@service.net

Non-Disclosure - Non-Circumvent - Confidentiality Agreement

FIG. 11.

SERVICE RETAIL

AVAILABLE - SCRUTINIZED - CONFIDENTIAL

INSURED INCOME!
DOMESTIC COMMERCIAL PROPERTIES

IN EXCESS OF $5 MILLION FOR PURCHASE OR EXCHANGE

[ Home Page ] [ System Exp ] [ Sample Data ] [ Qualifications ]

Click on a Property below to process the Non-Disclosure Non-Circumvent Agreement.
UPON RECEIPT YOU WILL RECEIVE A PROPERTY SPECIFIC PASSWORD INCLUDING BUT LIMITED TO:
Aerial, Photo, Rent Roll, NOI, Cap Rate, Financing Package,
Cash on Cash Projection, Cash Flow Projection, Comps by Radius,
Competition Report with Tenant Mix and Local Trend Report
&
SITE SPECIFIC MAPPING OF:
Income, Population, Consumer Expenditure, Retail Sales Potential, & Crime

| VIEW NATIONWIDE BUYERS | SELLER CONFIDENTIAL FREE SIGN UP | TENANT DEFAULT BUYER PROTECTION |
|---|---|---|
| SERVICE APARTMENTS | SERVICE OFFICE | SERVICE SALE LEASEBACKS |

Price Range: $ S-10 million, SS: 10-15 million, SSS: 15-20 million, SSSS: 20-25 million, SSSSS: 25+ million
Cap Rate: A: All  B: 9+, C: 8+, E: 7+, F: 6+
Property Types: SA -Stand Alone, NC - Neighborhood Center, CC– Community Center, RC– Regional Center, SR - Super Regional, SC - Shadow Center, GA- Grocery Anchored Center; DP- Distressed Property, LC- Lifestyle Center
Expense Offset: N-Net leased taxes Tenant paid, NN-Taxes & Insurance paid, NNN-Taxes, Insurance, Repairs & Maintenance paid, Abs NNN- all expenses paid by tenant
Region: US– Full USA, SE - Southeast, SW - Southwest, NE - Northeast, NW- Northwest, C -Central, E- East, W-West, G - Global

|  Price: $$$$$ CAP: 6.8 State: TX Type Life Style Center Remarks: 1031 exchange property, all buyers must escrow 20% before a contract will be considered. [Detailed Info] #_____ | Price: $ CAP: B Exp: NN Region: SE Type: Neighborhood Remarks: Retail Area [Detailed Info] #_____ | Price: SOLD CAP: 9.25 Exp: NN Region: W Type: Community Remarks: _____ [Detailed Info] Shadow Cen- |
|---|---|---|
| | Price: SOLD CAP: 7.25 State: AL County: Birmingham Type: Stand Alone [Detailed Info] #_____ | Price: $$ CAP: C State: GA Type: Regional Remarks: great upside [Detailed Info] #_____ |
| Price: $$$ CAP: D Exp: NNN Region: NW Type: Neighborhood Center [Detailed Info] #_____ | Price: $$$ CAP: D Exp: NNN Region: SE Type: Community [Detailed Info] #_____ | Price: SOLD CAP: 10.1 Exp: NNN Region: SW Type: Neighborhood Remarks: _____ [Detailed Info] |
| Price: $$$$ CAP: E Region: NW Type: Neighborhood Center Remarks: 75% nationals [Detailed Info] #_____ | Price: $$$$ CAP: D Exp: NNN Region: SE Type: Community [Detailed Info] #_____ | Price: $$$$ CAP: C Exp: NNN Region: SW Type: Neighborhood Remarks: [Detailed Info] |

FIG. 13.

SERVICE APARTMENTS

PRE QUALIFIED - SCRUTINIZED - CONFIDENTIAL
*AVAILABLE!*
PREMIUM APARTMENT PROPERTIES
IN EXCESS OF $5 MILLION FOR PURCHASE OR EXCHANGE

[ Home Page ] [ 1031US.com ] [ Sample Data ] [ Qualifications ] [ Home ]

Click on a Property below to process the Non-Disclosure Non-Circumvent Agreement.
UPON RECEIPT YOU WILL RECEIVE A PROPERTY SPECIFIC PASSWORD INCLUDING BUT LIMITED TO:
Aerial, Photo, Rent Roll, NOI, Cap Rate, Financing Package,
Cash on Cash Projection, Cash Flow Projection, Comps by Radius,
Competition Report with Tenant Mix and Local Trend Report
&
SITE SPECIFIC MAPPING OF:
Income, Population, Consumer Expenditure, Retail Sales Potential, & Crime

| View Nationwide Buyers | Seller Confidential Free Sign Up | Service Program Explanation |
|---|---|---|
| SERVICE RETAIL | SERVICE OFFICE | SERVICE SALE LEASEBACKS |

Price Range: $: 5-10 million, $$: 10-15 million, $$$: 15-20 million, $$$$: 20-25 million, $$$$$: 25+ million
Cap Rate: A: All B: 9+, C: 8+, E: 7+, F: 6+
Property Types: GAP - Garden Apartment HAP-High Rise Apartment.
Expense Offset: N-Net leased taxes Tenant paid, NN-Taxes & Insurance paid, NNN-Taxes, Insurance,
Repairs & Maintenance paid, Abs NNN– all expenses paid by tenant
Region: US– Full USA, SE - Southeast, SW - Southwest, NE - Northeast, NW– Northwest,
C -Central, E– East, W-West, G - Global

FIG. 14

SERVICE SALE-LEASEBACK

| Home Page | 1031US.com | Sample Data | Qualifications | Home |

PRE QUALIFIED - SCRUTINIZED - CONFIDENTIAL
AVAILABLE SALE - LEASEBACK PROPERTIES
IN EXCESS OF $5 MILLION FOR PURCHASE OR EXCHANGE

Click on a Property below to process the Non-Disclosure Non-Circumvent Agreement.
UPON RECEIPT YOU WILL RECEIVE A PROPERTY SPECIFIC PASSWORD INCLUDING BUT LIMITED TO:
Aerial, Photo, Rent Roll, NOI, Cap Rate, Financing Package,
Cash on Cash Projection, Cash Flow Projection, Comps by Radius,
Competition Report with Tenant Mix and Local Trend Report
&
SITE SPECIFIC MAPPING OF:
Income, Population, Consumer Expenditure, Retail Sales Potential, & Crime

| View Nationwide Buyers | Seller Confidential Free Sign Up | SERVICE Program Explanation |
|---|---|---|
| SERVICE RETAIL | SERVICE APARTMENTS | SERVICE OFFICE |

Price Range: $: 5-10million, $$: 10-15 million, $$$: 15-20 million, $$$$: 20-25 million, $$$$$: 25+ million
Cap Rate: A: All  B: 9+, C: 8+, E: 7+, F: 6+
Property Types: STLB– Single Tenant Lease Back Property MTLB– Multi Tenant Lease Back Property
Expense Offset: N-Net leased taxes Tenant paid, NN-Taxes & Insurance paid, NNN-Taxes, Insurance,
Repairs & Maintenance paid, Abs NNN– all expenses paid by tenant
Region: US– Full USA, SE - Southeast, SW - Southwest, NE - Northeast, NW– Northwest,
C -Central, E– East, W-West, G - Global

| | Price: $ / CAP: B / Exp: NN / Region: SE / Type: Garden / Remarks: Hwy Population Area | Price: SOLD / CAP: 9.25 / Exp: NN / Region: W / Type: Garden / Remarks: College Near By | Price: $ / CAP: B / Exp: NN / Region: W / Type: Garden / Remarks: Upscale Shopping District near by |
|---|---|---|---|
| Price:$$$$$ / CAP: 6.8 / State: TX / Type Luxury Garden / Remarks: 1031 exchange property, all buyers must escrow 20% before a contract will be considered. | Detailed Info # ____ | Detailed Info | Detailed Info # ____ |
| | Price: SOLD / CAP: 7.25 / State: AL / County: Birmingham / Type: Garden / Remarks: 1031 | Price: $$ / CAP: C / State: GA / Type: small High Rise / Remarks: great upside | Price: $$ / CAP: B / Exp: NN / Region: W / Type: Garden / Remarks: Shadow Center |
| | Detailed Info | Detailed Info # ____ | Detailed Info # ____ |
| Price: $$$ / CAP: D / Exp: NNN / Region: NW / Type: High Rise / Remarks: 95% historic occ | Price: $$$ / CAP: D / Exp: NNN / Region: SE / Type: Garden / Remarks: Outparcels included | Price: SOLD / CAP: 10.1 / Exp: NNN / Region: SW / Type: Garden / Remarks: | Price: SOLD / CAP: 9.25 / Exp: NN / Region: W / Type: Garden / Remarks: |
| Detailed Info # ____ | Detailed Info # ____ | Detailed Info | Detailed Info |
| Price: $$$$ / CAP: E / Region: NW / Type: Luxury High Rise / Remarks: | Price: $$$$ / CAP: C / Exp: NNN / Region: SW / Type: High Rise / Remarks: | Price: $$$$ / CAP: D / Exp: NNN / Region: SE / Type Luxury Garden / Remarks: Outparcels in- | Price: SOLD / CAP: 9.25 / Exp: NN / Region: W / Type: Garden / Remarks: |
| Detailed Info # ____ | Detailed Info # ____ | Detailed Info # ____ | Detailed Info |

FIG. 16.

1031 EXCHANGE SERVICE

PRE QUALIFIED - SCRUTINIZED - CONFIDENTIALLY AVAILABLE
QUALIFIED EXCHANGE PROPERTIES
READY FOR IDENTIFICATION
IN EXCESS OF $5 MILLION FOR PURCHASE OR EXCHANGE

Click on a Property below to process the Non-Disclosure Non-Circumvent Agreement.

UPON RECEIPT YOU WILL RECEIVE A PROPERTY SPECIFIC PASSWORD INCLUDING BUT LIMITED TO:
Aerial, Photo, Rent Roll, NOI, Cap Rate, Financing Package,
Cash on Cash Projection, Cash Flow Projection, Comps by Radius,
Competition Report with Tenant Mix and Local Trend Report
&
SITE SPECIFIC MAPPING OF:
Income, Population, Consumer Expenditure, Retail Sales Potential, & Crime

| Facilitator Service | 1031 CIREI Articles | National Intermediaries |
|---|---|---|
| | Price: $$<br>CAP: 8.7<br>State: AL<br>Type: Community<br>Remarks: *Outparcels included* | Price: SOLD<br>CAP: 10.1<br>State: AL<br>County: Baldwin<br>Type: Neighborhood<br>Remarks: |
| Price: $$$$$<br>CAP: 6.8<br>State: TX<br>Type Life Style Center<br>Remarks: 1031 exchange property, all buyers must escrow 20% before a contract will be considered. | Price: $$$<br>CAP: 8<br>State: AL<br>Type: Neighborhood<br>Remarks: *Hvy Retail Area great upside* | Price: SOLD<br>CAP: 9.25<br>State: AL<br>County: Birmingham<br>Type: Community<br>Remarks: Shadow Center |
| Price: $$$$<br>CAP: 7.25<br>State: NC<br>Type: Neighborhood Center<br>Remarks: 75% nationals | Price: SOLD<br>CAP: 7.25<br>State: AL<br>County: Birmingham<br>Type: Stand Alone<br>Remarks: 1031 | Price: $$$$<br>CAP: 7<br>State: GA<br>Type: Regional<br>Remarks: *Hvy Retail Area great upside* |

FIG. 17.

FACILITATOR SERV...

A Powerful Industry Exclusive

A Valuable <u>New</u> Owner Protection Tool:

TENANT DEFAULT INCOME INSURANCE!
Up to 36 month Secured Acquisition NOI
Offered Exclusively by Facilitator.

NO Charge
to Buyers and Sellers.

When a registered Buyer purchases a Facilitator marketed property they you receive a free Title Policy and a Free Tenant Default Income Insured Protection Plan at closing that affords you piece of mind guaranteeing your leasehold income for up to three years.

During your initial period of ownership, while you are becoming intimately familiar with your new asset, Facilitator steps up and assures you of your income and will work hard to refill your vacancy as we are paying the rent on the vacant space for up to one year any time during your first 24 months of ownership.

Available Properties   Buyer Qualifications

Acquisition Entity Sign Up

FIG. 18.

SYSTEM, METHOD AND COMPUTER PROGRAM PRODUCT FOR FACILITATING REAL ESTATE TRANSACTIONS

CROSS-REFERENCE TO RELATED APPLICATIONS

The present application claims priority from U.S. Provisional Patent Application Ser. No. 60/565,554, entitled: SYSTEM, METHOD AND COMPUTER PROGRAM PRODUCT FOR FACILITATING REAL ESTATE TRANSACTIONS, filed on Apr. 27, 2004, the contents of which are incorporated herein by reference in its entirety.

FIELD OF THE INVENTION

The present invention generally relates to systems and methods for facilitating real estate transactions and, more particularly, to systems, methods and computer program products for facilitating transactions regarding commercial real estate properties.

BACKGROUND OF THE INVENTION

In the commercial real estate industry, potential sellers of commercial real estate often avoid publicly advertising or listing their real estate, and potential buyers are often very cautious about purchasing commercial real estate that has existing tenants. Potential sellers often fear that existing tenants of affected properties will look to lease space elsewhere, and/or that potential tenants will avoid leasing space within the affected properties. Potential buyers, on the other hand, are typically reluctant to purchase property due to the risk of default of tenants leasing space within the property.

In addition, potential sellers typically prefer to not be "shopped" by competitors, or felt out by numerous developers and/or potential buyers. Further, potential sellers typically prefer to not be limited by listing agreements or agency relationships that bind the potential sellers to a single brokerage firm or an unnecessary agency liability for a specific duration. And as a result of potential sellers avoiding public advertising or listing of their properties, in various segments of commercial real estate, the demand of available potential buyers may significantly outnumber the supply of known, publicly available properties. However, this generally does not reflect the fact that the demand of available potential buyers significantly outnumbers the supply of properties available for purchase, only that a significant number of available properties may not be publicly available, and thus known to potential buyers.

SUMMARY OF THE INVENTION

In light of the foregoing background, embodiments of the present invention provide an improved system, method and computer program product for facilitating real estate transactions. The system, method and computer program product of embodiments of the present invention are capable of permitting buyers and sellers to initiate communication with one another regarding properties of the sellers. Advantageously, the system, method and computer program product permit the buyers and sellers to communicate with one another without outside interference to facilitate the buyers and sellers concluding a real estate sales or exchange transaction. And since buyers are typically reluctant to purchase property due to the risk of default of tenants leasing space within the property, the system, method and computer program product of embodiments of the present invention may also provide, for a period of time, insurance to the buyer against loss of income due to default of the existing tenants of the property, should a buyer and seller conclude the purchase/sale of a property.

According to one aspect of the present invention, a method is provided for facilitating a real estate transaction. In accordance with the method of this aspect, an initiating party is engaged in communication with an initiated party regarding a property, where the parties are engaged for an engagement period. In this regard, the initiating party can be a buyer arrangement or a seller arrangement, with the initiated party being the other of the buyer arrangement and the seller arrangement. Before engaging the parties in communication, however, at least one buyer arrangement and at least one seller arrangement can be registered, where registering the buyer arrangement(s) and seller arrangement(s) includes registering the initiating party and the initiated party. More particularly, for example, the buyer arrangement(s) can be registered by receiving at least one piece of buyer information relating to the buyer arrangement(s), and thereafter evaluating the buyer information to determine if the piece(s) of buyer information are accurate, and to determine if the buyer arrangement(s) are qualified to purchase at least one property of at least one registered seller arrangement. Then, if the piece(s) of buyer information are accurate, and the buyer arrangement(s) are qualified, the buyer arrangement(s) can be registered.

After engaging the parties, the engaged parties are restricted from communicating with other parties during the engagement period, the other parties being at least one other buyer arrangement and/or at least one other seller arrangement. As explained below, the engaged parties can be restricted from communicating with other parties in a number of different manners. Irrespective of how the parties are restricted from communicating with other parties, however, restricting the parties advantageously facilitates the parties concluding a real estate transaction regarding the property. In this regard, the method can further include concluding a real estate transaction between the parties regarding the property after restricting the engaged parties from communicating with other parties.

More particularly, a buyer listing and/or a property listing can be provided, where the buyer listing includes at least one buyer arrangement, and the property listing includes at least one property of at least one seller arrangement. In such instances, one of the listings includes the initiating party and the other listing includes the initiated party. The engaged parties can then be restricted by from communicating with other parties by restricting access to the initiating party in the respective listing including the initiating party, and restricting access to the initiated party in the respective listing including the initiated party. Before engaging the parties in communication and thus restricting the parties, however, the initiating party can select a selection of an initiated party from one of the listings can be received, where the initiated party is selected by the initiating party. The initiating party can then be provided with an agreement, which the initiating party can execute and thereafter return. The executed agreement can be received, and thereafter access-restricted information can be provided to the initiated party. In such instances, the access-restricted information is related to the initiated party.

In various instances, the parties are engaged in communication regarding an income-producing property having at least one tenant. In such instances, the method can further include insuring the buyer arrangement for a period of time against a loss of income due to a default of at least one tenant if the parties conclude a real estate transaction regarding the property. In this regard, the buyer arrangement can be provided with a policy. Thereafter, it can be determined if a tenant defaults under the policy. And if a tenant does default, a policy benefit can be determined, and remitted to the buyer arrangement.

According to other aspects of the present invention, a system and computer program product are provided for facilitating a real estate transaction. Therefore, embodiments of the present invention provide an improved system, method and computer program product for facilitating a real estate transaction. Embodiments of the present invention can facilitate real estate transactions by engaging buyer and seller arrangements in a secure manner such that the parties other parties can communicate to conclude a real estate transaction without outside interference. Further, embodiments of the present invention may also provide insurance against default of a tenant leasing space within an income-producing property to further facilitate the real estate transaction, particularly since buyers are typically reluctant to purchase property due to the risk of such defaulting tenants. Therefore, the system, method and computer program product of embodiments of the present invention solve the problems identified by prior techniques and provide additional advantages.

BRIEF DESCRIPTION OF THE DRAWINGS

Figure 1:
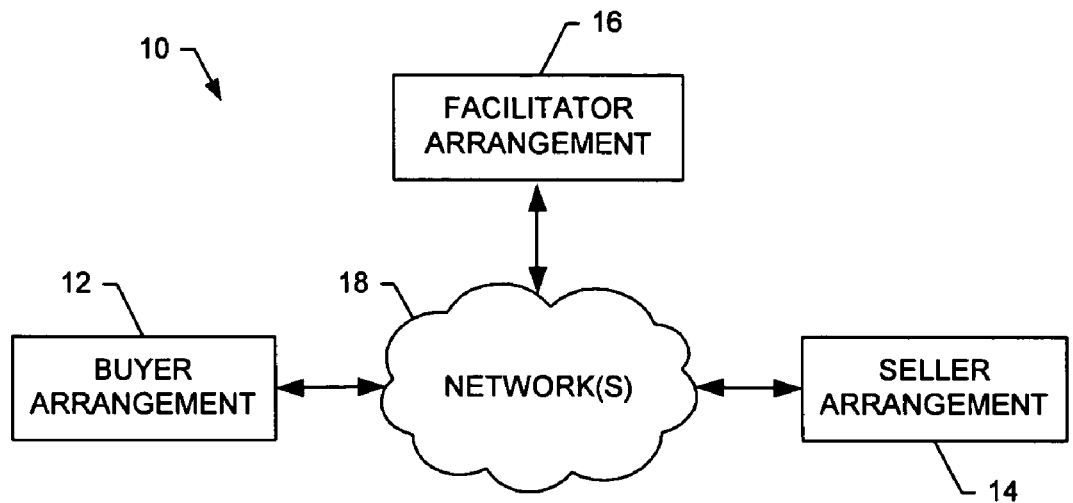
Figure 2:
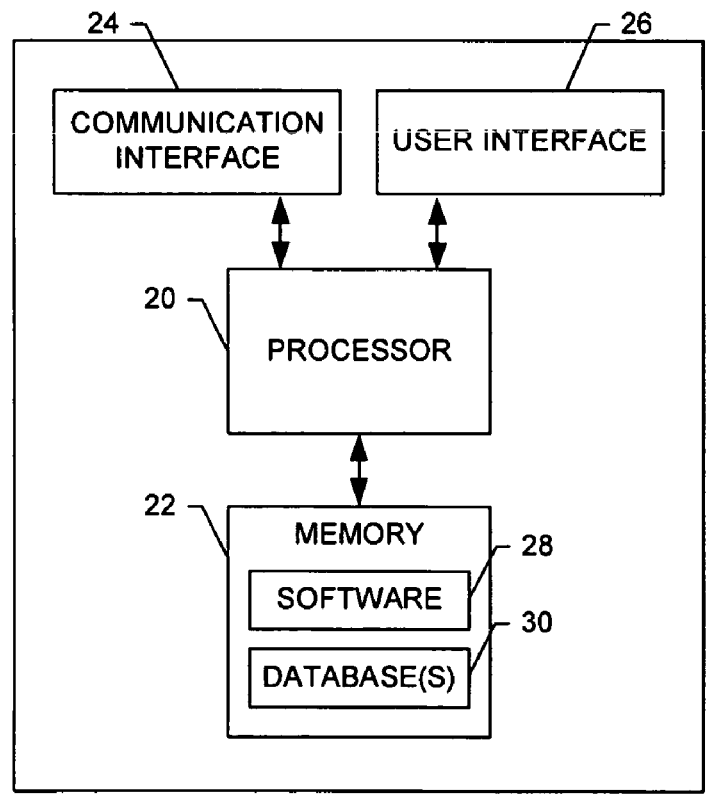
Figure 3A:
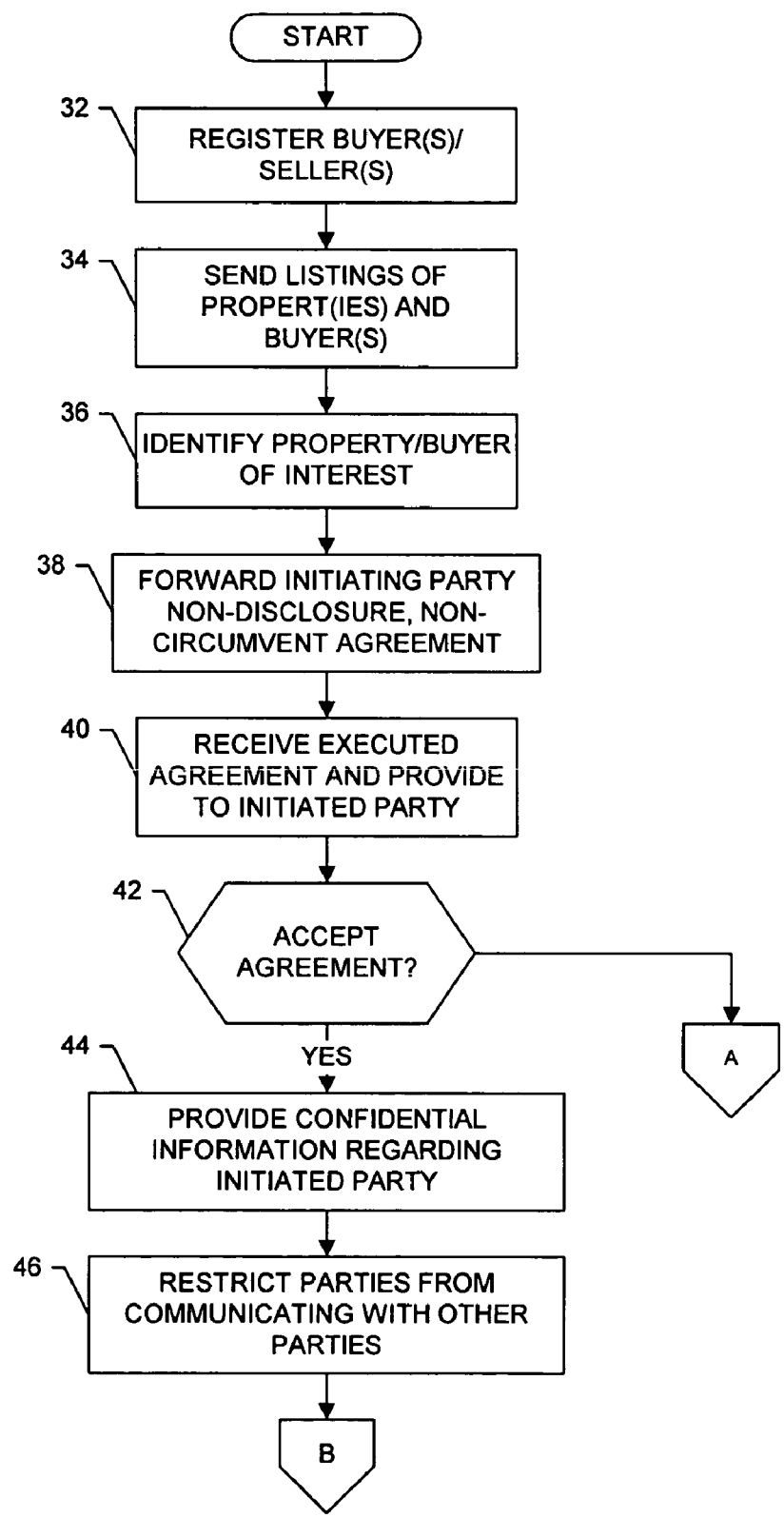
Figure 3B:
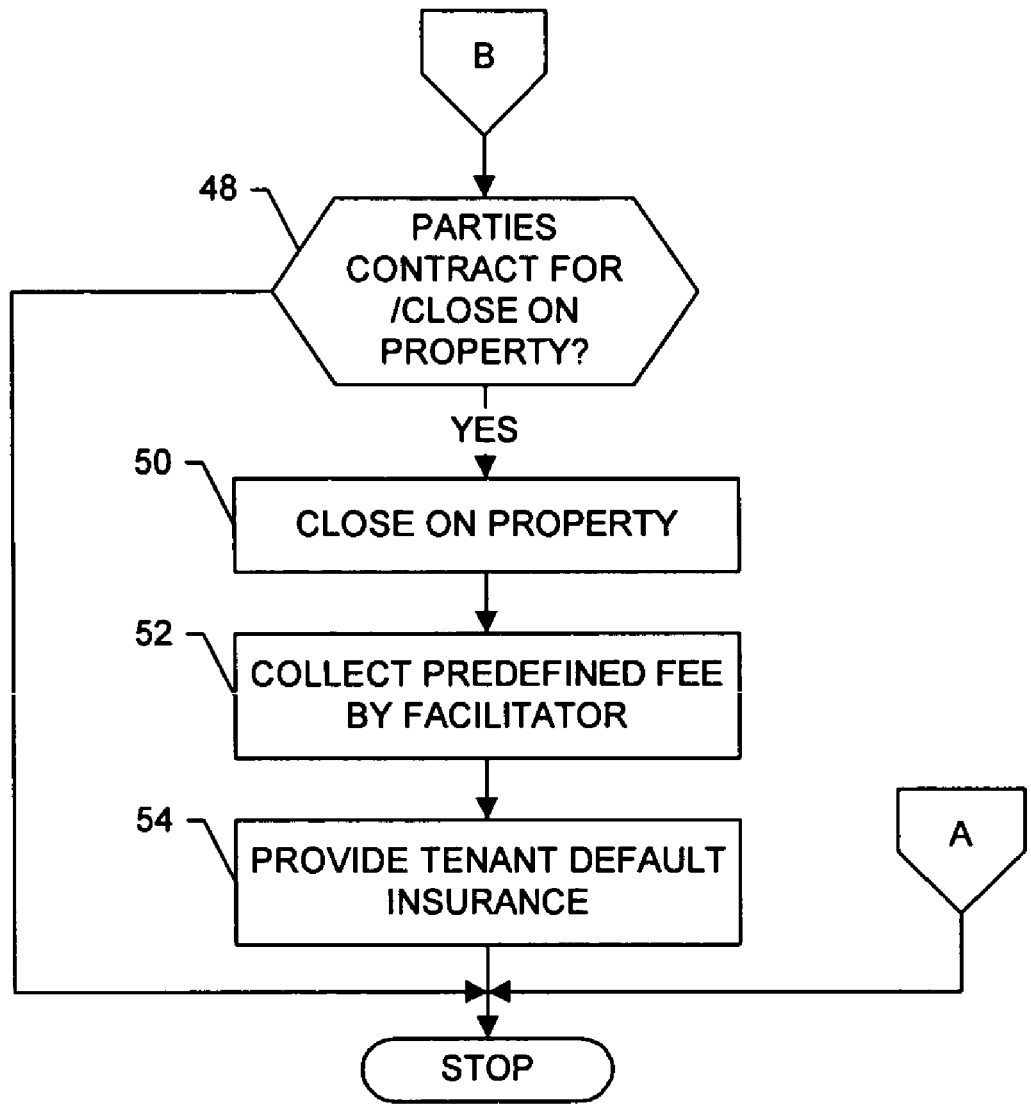
Figure 4:
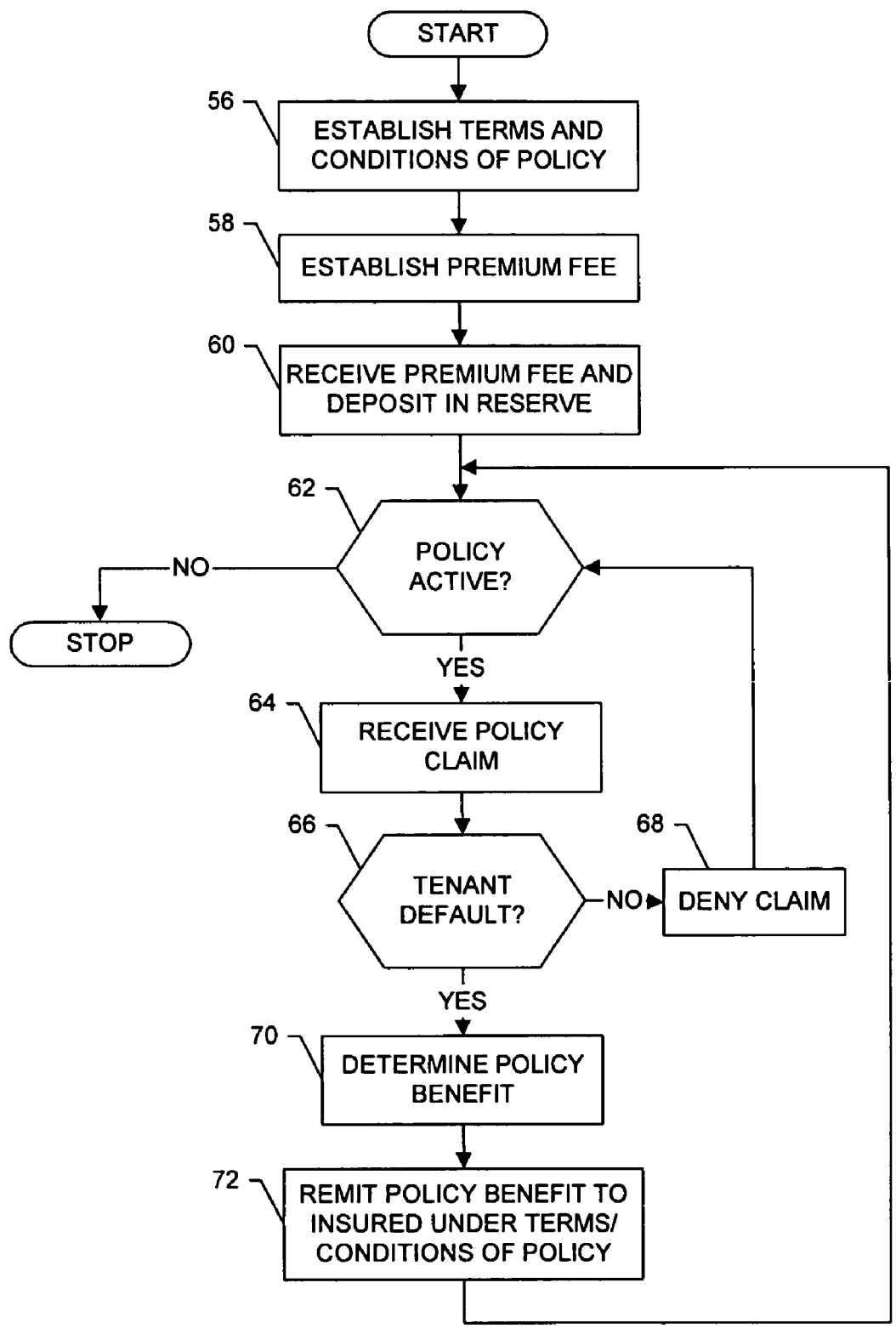

Having thus described the invention in general terms, reference will now be made to the accompanying drawings, which are not necessarily drawn to scale, and wherein:

FIG. 1 is a schematic block diagram of a system for facilitating real estate transactions in accordance with embodiments of the present invention;

FIG. 2 is a schematic block diagram of an entity capable of operating as a buyer, seller and/or facilitator, in accordance with embodiments of the present invention;

FIGS. 3A and 3B are flowcharts illustrating various steps in a method of facilitating a real estate transaction in accordance with an embodiment of the present invention;

FIG. 4 is a flowchart illustrating various steps in a method of insuring the owner or leaseholder of income-producing property against the default of one or more tenants of such property, in accordance with an embodiment of the present invention; and FIGS. 5–18 illustrate exemplar displays capable of being provided by a facilitator arrangement to buyer arrangements and seller arrangements, in accordance with embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a system 10 for facilitating real estate transactions includes one or more buyer arrangements 12, seller arrangements 14 and facilitator arrangements 16 (one of each being shown). Each buyer arrangement is capable of directly and/or indirectly communicating with one or more seller arrangements and facilitator arrangements. Similarly, each seller arrangement is capable of directly and/or indirectly communicating with one or more buyer arrangements and facilitator arrangements; and each facilitator arrangement is capable of directly and/or indirectly communicating with one or more buyer arrangements and seller arrangements. In this regard, the buyer, seller and facilitator arrangements can be capable of directly and/or indirectly communicating with one another across one or more networks 18. The network(s) can comprise any of a number of different combinations of one or more different types of networks. For example, the network(s) can include one or more data networks, such as a local area network (LAN), a metropolitan area network (MAN), and/or a wide area network (WAN) (e.g., Internet), and include one or more wireline and/or wireless voice networks, including a wireline network such as a public-switched telephone network (PSTN), and/or wireless networks such as IS-136 (TDMA), GSM, and/or IS-95 (CDMA). For purposes of illustration, however, as described below, the network comprises the Internet (i.e., WAN) unless otherwise noted.

The buyer arrangement 12, seller arrangement 14 and facilitator arrangement 16 can comprise any one or more of a number of different entities, devices or the like capable of operating in accordance with embodiments of the present invention. In this regard, one or more of the buyer arrangement, seller arrangement and facilitator arrangement can comprise, include or be embodied in one or more processing elements, such as one or more of a laptop computer, desktop computer, server computer or the like. Additionally or alternatively, one or more of the buyer arrangement, seller arrangement and facilitator arrangement can comprise, include or be embodied in one or more portable electronic devices, such as one or more of a mobile telephone, portable digital assistant (PDA), pager or the like. For example, the buyer arrangement, seller arrangement and facilitator arrangement can each comprise a processing element capable of communicating with one another across the Internet (e.g., network 18).

It should be understood, however, that one or more of the buyer arrangement 12, seller arrangement 14 and facilitator arrangement 16 can comprise or otherwise be associated with a user carrying out the functions of the respective entity. For example, the buyer arrangement can comprise a buyer or buyer agent (representing a buyer) communicating across a PSTN (e.g., network 18), by mail or in person with a seller operating a seller processing element, where the seller and processing element collectively comprise the seller arrangement. In such instances, the facilitator arrangement can comprise a facilitator processing element communicating across the Internet with the seller processing element. Alternatively, in such instances, the facilitator can comprise a facilitator operating a facilitator processing element, where the facilitator is capable of communicating with the seller across a PSTN. As explained below, then, the term "buyer arrangement" can refer to a buyer and/or buyer processor. Similarly, the term "seller arrangement" can refer to a seller and/or seller processor; and the term "facilitator arrangement" can refer to a facilitator and/or facilitator processor.

Referring now to FIG. 2, a block diagram of an entity capable of operating as a buyer arrangement 10, seller arrangement 14 and/or facilitator arrangement 16 is shown in accordance with one embodiment of the present invention. Although shown as separate entities, in some embodiments, one or more entities may support one or more of a buyer arrangement, seller arrangement and/or facilitator arrangement, logically separated but co-located within the entit(ies). For example, a single entity may support a logically separate, but co-located, buyer arrangement and facilitator arrangement. Also, for example, a single entity may support a logically separate, but co-located seller arrangement and facilitator arrangement.

As shown, the entity capable of operating as a buyer arrangement 12, seller arrangement 14 and/or facilitator arrangement 16 can generally include a processor 20 connected to a memory 22. The processor can also be connected to at least one communication interface 24 or other means for transmitting and/or receiving data, content or the like. The processor can additionally be connected to a user interface 26 that can include a display and a user input interface. The user input interface, in turn, can comprise any of a number of devices allowing the entity to receive data from a user, such as a keypad, a touch display (not shown) or other input device.

The memory 30 can comprise volatile and/or non-volatile memory, and typically stores content, data or the like. In this regard, the memory typically stores software applications 28, instructions or the like for the processor to perform steps associated with operation of the entity in accordance with embodiments of the present invention. For example, the memory can store software applications such as one or more connectivity applications (e.g., Web browser, etc.). Also, when the entity comprises a facilitator arrangement 16, the memory can store one or more databases 38, such as a buyer database and a property database. The buyer database can store information relating to buyers registered with the service offered by the facilitator arrangement, and the property database can store information relating to sellers and associated properties that are registered with the service.

In accordance with embodiments of the present invention, the facilitator arrangement 16 is capable of offering a real estate information exchange service to one or more buyer arrangements 12 and seller arrangements 14. Generally, the service provides a medium for buyers and sellers to communicate with one another without outside interference to facilitate the respective arrangements concluding a real estate sales or exchange transaction. And since buyers are typically reluctant to purchase property due to the risk of default of tenants leasing space within the property, if so desired, the service can also provide, for a period of time, insurance to the buyer against loss of income due to default of the existing tenants of the property, should a buyer and seller conclude the purchase/sale of a property. As described herein, such insurance may be referred to as "tenant default insurance."

Reference is now made to FIGS. 3A and 3B, which illustrates various steps in a method of facilitating a real estate transaction, in accordance with one embodiment of the present invention. As shown in block 32, the method can include the one or more buyers and sellers of the buyer arrangements 12 and seller arrangements 14, respectively, registering with the facilitator arrangement 16, or more particularly with the service offered by the facilitator arrangement. Advantageously for the sellers, during the registration process of the buyers, information regarding the buyers can be generated, gathered or otherwise received by the facilitator arrangement. For example, the facilitator arrangement can gather information regarding property purchases made by the buyer arrangements over a previous period of time (e.g., previous 12–24 months). The facilitator arrangement can then evaluate such buyer information to determine if the buyer information is accurate to thereby determine if the buyers are legitimate. For example, the facilitator arrangement can evaluate information regarding property purchases made by the buyer to determine the nature of the financing used to purchase the properties (e.g., all cash, mortgage, owner financing, equity trade, etc.). In addition, the facilitator arrangement can evaluate the buyer information to determine if the buyers are qualified to purchase an indicated level of real estate. In this regard, if the facilitator arrangement fails to determine that the buyers are legitimate and qualified, the facilitator arrangement can refuse to register the respective buyers. Otherwise, the facilitator arrangement can register the buyers with the service offered by the facilitator arrangement.

For the buyers, information regarding the properties of the sellers and/or the sellers themselves can be generated, gathered or otherwise received by the facilitator arrangement 16. The facilitator arrangement can then evaluate such seller information to allow the facilitator arrangement to provide data related to the properties. For example, the facilitator can receive and thereafter evaluate or otherwise confirm seller information including blueprints, aerial photos, zoning, certificates of occupancy, various regulatory approval letters, rent rolls, parking ratios, setbacks, surveys, inspections, NOI's (net operating incomes), cap (capitalization) rates, financing packages, cash on cash projections, cash flow projections, comparables by radius, competition reports with tenant mix and local trend reports, as well as property specific mapping of income, population, consumer expenditure, retail sales and crime statistics.

Before, after or as the facilitator arrangement 16 evaluates the buyer information or seller information, the facilitator arrangement can create an entry for the buyer or the seller in the buyer database or property database. Also, in accordance with the service provided by the facilitator arrangement, the facilitator arrangement can send the buyer arrangements 12 listings of the properties of sellers stored in the property database, and send the seller arrangements 14 listings of buyers stored in the buyer database, as shown in block 34. The listings of properties and buyers can include any of a number of different pieces of seller information and buyer information, respectively. In one typical embodiment, for example, the listings of properties and buyers include a portion of the seller and buyer information sufficient to allow the buyers and sellers to gauge an interest in one or more properties of the sellers or one or more buyers, respectively. To facilitate the buyers and sellers engaging the service of the facilitator arrangement, however, the listings may not include information sufficient to permit the buyers or sellers to contact one another independent of the service.

After receiving the respective listings at the buyer arrangements 12 and seller arrangements 14, the buyers can identify properties of interest, and the sellers can identify buyer arrangements of interest, as shown in block 36. If either a buyer or seller (i.e., the initiating party) desires to contact a seller or buyer (i.e., the initiated party), directly or as a result of actions of the facilitator arrangement, the facilitator arrangement can forward the initiating party arrangement a non-disclosure, non-circumvent facilitation agreement in which the initiating party agrees to pay the facilitator arrangement a predefined fee for the service provided by the facilitator arrangement should the initiating party and initiated party conclude a real estate transaction with one another, as shown in block 38.

After the initiating party (i.e., buyer or seller) executes the non-disclosure, non-circumvent facilitation agreement, and the initiating party arrangement (i.e., buyer arrangement 12 or seller arrangement 14) returns the executed agreement to the facilitator arrangement 16, the facilitator arrangement can forward the agreement to the initiated party arrangement (i.e., seller arrangement or buyer arrangement) for acceptance by the initiated party (i.e., buyer or seller), as shown in block 40. Provided the initiated party accepts the agreement (see block 42), the facilitator arrangement can provide, to the initiating party arrangement, confidential, access-restricted information related to the initiated party, as shown in block 44. The confidential information can be provided in any of a number of different manners, such as by forwarding the initiating party arrangement a password permitting the initiating party arrangement to access the confidential information. For example, the facilitator arrangement can permit a buyer arrangement to access confidential information comprising one or more pieces of seller information regarding the seller and,/or the seller's property of interest to the buyer arrangement. The access-restricted seller information and buyer information can include any of a number of different pieces of information, including contact information for the seller and buyer, and one or more of the pieces of seller information and buyer information indicated above. However, at least a portion of the confidential information typically comprises information not having been included in the listings previously sent to the buyer arrangement and seller arrangement (see block 34).

Irrespective of the confidential information provided to the initiating party arrangement, once the initiating and initiated parties are engaged in communication, the parties can be restricted from contacting other parties (i.e., other sellers and buyers) for a predefined engagement period (e.g., five days). In this regard, the parties can be considered engaged in communication in any of a number of different manners. For example, the parties can be considered engaged in communication once the initiated party accepts the non-disclosure, non-circumvent agreement, or once the initiated party receives the password or uses the password to access information related to the initiated party, as shown in block 46. Irrespective of when the parties are considered engaged in communication, during the engagement period, the buyer can be restricted from communicating with other sellers regarding other properties. Likewise, the seller can be restricted from communicating with other buyers regarding the same property during the engagement period. The parties can be restricted from communicating with other parties in any of a number of different manners. For example, the facilitator can contractually restrict the parties from communicating with other parties. Additionally or alternatively, for example, the facilitator arrangement can remove, or otherwise restrict access to, the parties from the listings of properties and buyers sent to other buyer arrangements 12 and seller arrangements 14 (see block 34). Advantageously, restricting each party from communicating with other parties during the engagement period can facilitate the parties concluding a real estate transaction with one another without outside interference.

After the initiating and initiated parties are engaged in communication, the parties may desire to conclude a real estate transaction regarding a property of the seller. In such an instance, the parties can conclude the real estate transaction in any of a number of different manners, such as by entering into a sales contract regarding a respective property and closing on the respective property, shown in block 48. In such instances, the facilitator can operate outside the transaction, or alternatively function as a broker for the transaction. In another alternative, the facilitator can engage a broker, closing agent or other facilitator for the transaction, with the facilitator and the engaged party entering into a separate agreement related to the brokering of the transaction. In either event, at the conclusion of the transaction, such as during closing of the property, the facilitator can collect the predefined fee from the initiating party for the service provided by the facilitator, as shown in blocks 50 and 52. Also at the conclusion of the transaction, if so desired and previously offered by the facilitator, the facilitator can provide the buyer with a limited duration tenant default insurance policy, as shown in block 54 and explained below.

As explained above, the service offered by the facilitator arrangement 16 can provide, for a period of time, tenant default insurance to the buyer against loss of income due to default of the existing tenants of the property, should a buyer and seller conclude the purchase/sale of a property of the seller. In this regard, the facilitator arrangement can provide the buyer and seller of leasehold interest property the ability to insure income from that property against default of one or more tenants of that property under the terms of one or more leases held for that property at time of concluding the purchase/sale of the property. As will be appreciated, the facilitator can provide the insurance as a self-insurer. Additionally or alternatively, however, the facilitator can engage a fourth party, such as an insurance carrier, to provide all or a portion of the insurance through the fourth party or in conjunction with underwriting of the fourth party.

Reference is now made to FIG. 4, which illustrates various steps in a method of insuring the owner or leaseholder of income-producing property against the default of one or more tenants of such property, the property being referred to herein as the "insured property." As shown in block 56, the method includes the facilitator arrangement 16 establishing the terms and conditions of an insurance policy under which the facilitator arrangement intends to insure the buyer or new owner of the insured property, who is also typically the leaseholder of one or more leases for the insured property or portions thereof (the buyer, owner, leaseholder also referred to herein as the "insured party"). The terms and conditions can include any of a number of different terms and conditions specific to the protection provided the insurance policy, and if so desired, can include one or more terms and/or conditions typically offered under conventional insurance policies.

For example, the terms and conditions of the insurance policy can include a time period over which the policy is active, as well as define default of a tenant for which the policy covers loss of income. Default of a tenant can be defined in a number of different manners, such as in accordance with one of more provisions of the lease entered into by the tenant with respect to the insured property. More particularly, for example, the default of a tenant can be defined in accordance with provision(s) of the lease that relate to the financial inability of the tenant to pay rent under the terms of the lease. If so desired, default can also be defined based upon tenant holdover or occupancy during a period in which the tenant is not paying all or a portion of the rents due under the terms of the lease, against the will of the leaseholder. However, default is typically not based upon acts of God, construction delays and/or interruption of occupancy reason.

In addition to defining default of a tenant, the terms and conditions established by the facilitator arrangement 16 can include different levels of tenant default insurance, typically in accordance with a review of the financial status of the property tenancy. The levels of tenant default insurance can vary in any of a number of different manners. In this regard, the facilitator arrangement can provide tenant default insurance that covers all or a portion of the tenants of the insured property, where the covered tenant(s) may or may not be specified. Also, the facilitator arrangement can provide tenant default insurance that varies based upon the length and breadth of income protection coverage, and the percentage of income protection. The percentage of income protection, which can also correspond to the total liability or exposure of the facilitator arrangement in providing the insurance, can be determined in any of a number of different manners. In one embodiment, for example, the percentage of income protection is based upon the net operating income (NOI) of the insured property at the conclusion of the transaction. As an example, then, the facilitator arrangement can provide coverage ranging from 1% to 100% of the NOI, extending for the first twenty-four months of ownership (two years from transaction conclusion), and guaranteeing income for twelve months at any time during the first twenty-four months.

In addition, for example, the terms and conditions established by the facilitator arrangement 16 can require the insured party to evict a defaulting tenant, typically for non-payment of rent. Further, the terms and conditions can include a number of rights reserved by the facilitator arrangement with respect to the insured party, and/or the insured property. For example, the terms and conditions can include rights reserved by the facilitator arrangement such as the right to (a) re-lease and or be paid to re-lease the vacated, insured property or portion thereof immediately upon tenant default, (b) insure only the leasehold interest in place at time of property acquisition by the insured party, (c) determine the time, time period and extent of coverage, (d) refuse to offer or discontinue service or coverage under the policy for any reason, (e) to offer coverage for any property for which there is a leasehold interest created, (f) offer this service on all or a portion of the tenancy of a given property, (g) sue for damages and expenses if the facilitator arrangement determines that the default was unnecessarily constructed for the financial gain of tenant and/or insured party, (h) deny coverage if the tenant and insured party are related, in business together, have any financial gain to or from each other as a result of tenant default, or tenant and/or leaseholder conspire or collude with any third party for the benefit of leaseholder or tenant, (i) increase, extend or modify our service or coverage on all or a part of any leasehold protection offered by the facilitator arrangement, at the sole discretion of the facilitator arrangement, (j) extend coverage through third party sources at the sole discretion of the facilitator arrangement, (k) offer coverage directly or sub-contract such coverage for a fee to any legally qualified second or third party at the sole discretion of the facilitator arrangement, (l) legally offer coverage domestically or internationally, (m) terminate coverage with any secondary provider for any reason and reassign such right of coverage to another legally capable party or offer coverage directly, (n) franchise or contract with other companies to legally provide service under the policy, (o) offer service or coverage under the policy under different names in different forms, and/or (p) offer service under the policy to any leasehold interest property through various delivery mediums including the Internet (i.e., network 18).

Before, as or after the facilitator arrangement 16 establishes the terms and conditions of the insurance policy, the facilitator arrangement can establish a premium fee for providing the insurance policy, as shown in block 58. The premium fee can be established In any of a number of different manners. For example, the premium fee can be established based upon the sales price, or open market value, of the insured property.

However, to provide benefit to the insured party, the premium fee is typically less than the total coverage provided by the insurance policy. In this regard, see Table 1 below for a sampling of ten exemplar properties sold and insured in accordance with embodiments of the present invention.

TABLE 1

| NOI ($) | CAP Rate | Sale Price ($) | Premium Fee (0.5%) ($) | Exposure ($) | Actuarial Exposure (3%) ($) |
|---|---|---|---|---|---|
| 500,000 | 10 | 5,000,000 | 25,000 | 75,000 | |
| 2,000,000 | 8 | 25,000,000 | 125,000 | 300,000 | |
| 750,000 | 9 | 8,333,333 | 41,500 | 112,500 | |
| 1,000,000 | 9 | 11,111,111 | 56,000 | 150,000 | |
| 600,000 | 9 | 6,667,000 | 34,000 | 90,000 | |
| 800,000 | 9 | 8,889,000 | 44,000 | 120,000 | |
| 500,000 | 10 | 5,000,000 | 25,000 | 75,000 | |
| 950,000 | 8 | 11,875,000 | 60,000 | 142,500 | |
| 3,500,000 | 7 | 50,000,000 | 250,000 | 525,000 | |
| 1,500,000 | 8 | 18,750,000 | 93,750 | 225,000 | |
| 12,100,000 | | 150,625,444 | 754,250 | 1,815,000 | 363,000 |

As shown in Table 1, presuming coverage of 15% of the NOI and a premium of 0.5% the sales price, the premium can equal approximately one-third of the total coverage provided by the insurance policy, which also corresponds to the total liability or exposure of the facilitator arrangement 16. Although the premium fee is typically less than the total coverage (total exposure) provided by the insurance policy, the actuarial exposure of the facilitator arrangement, or the more likely exposure of the facilitator arrangement, is typically less than the premium fee. To offset the total exposure, or more particularly the total actual exposure, then, the facilitator arrangement can reinsure the actuarial exposure of the facilitator arrangement, such as with a fourth party insurance carrier. However, if during the period of the insurance policy the facilitator arrangement determines the level of insurance with the fourth party insurance carrier does or will not adequately cover the exposure of the facilitator arrangement, the facilitator arrangement can adjust the level of coverage with the fourth party insurance carrier accordingly.

The actuarial exposure of the facilitator arrangement 16 can be estimated or otherwise determined in any one of a number of different manners. For example, the actuarial exposure can be estimated based upon the historical tenant default rate of the insured property over the duration of ownership of the insured property, and the NOI of the insured property. As will be appreciated, different properties have different historical tenant default rates over the duration of ownership of the respective properties. For example, retail, office and industrial properties historically have had a 7% default rate due to tenant vacancy and credit loss (i.e., default). But since the tenant default insurance is typically only based upon tenant default, the historical default rate can be estimated to be approximately half or less than half of the total historical default rate. Thus, for example, for retail, office and industrial properties, the actuarial tenant default rate can be estimated to equal approximately 3% or less. Thus, for retail, office and industrial properties, the actuarial exposure of the facilitator arrangement can be estimated to equal 3% of the NOI of the respective properties. As shown from Table 1, then, the actuarial exposure of the facilitator arrangement can be estimated to equal approximately $363,000 (i.e., 3% of 12,100,000), which is less than the premium fee of $754,250, which is less than the total coverage or total actual exposure of the facilitator arrangement, i.e., $1,815,000.

Irrespective of how the premium fee is established, the facilitator arrangement can thereafter receive the established premium fee from the insured party, such as the buyer arrangement 12 and/or the seller arrangement 14, and deposit that premium fee in reserve, as shown in block 60. In one typical embodiment where the insurance policy is offered in conjunction with the sale of property, the premium fee can be received by reserving a percentage (e.g., 0.5%) of the predefined fee received from the initiating party at the conclusion of a real estate transaction between the buyer arrangement and the seller arrangement. Alternatively, the premium fee can be received from the insured party independent of a real estate transaction. In such an instance, the insured party may operate as an owner or leaseholder of the insured property. In either event, the facilitator can deposit the percentage of the predetermined fee or additional fee (i.e., the premium fee) with a fourth party, such in a reserve account of a bank.

As or after receiving and depositing the premium fee, and while the policy is active (block 62), the insured party (e.g., buyer arrangement 12) may at one or more times receive notice that one or more tenants of the insured property have defaulted on paying rent under the terms of their lease under the terms of the policy. The insured party can receive notice in any of a number of different manners, such as by receiving notice of default directly from the tenant, and/or failure to receive a periodic (e.g., monthly) rental payment from the tenant. In such an instance, the insured party can notify the facilitator arrangement 16 of the tenant default, such as by filing an insurance claim with the facilitator arrangement, as shown in block 64. As will be appreciated, the insurance claim can include any of a number of different pieces of information including, for example, the identity of the defaulting tenant, rental income due to the insured party from the defaulting tenant, the remaining term of the defaulting tenant's lease or the like.

After receiving notification of the tenant default, the facilitator arrangement 16 can determine if the tenant has defaulted under the terms and conditions of the insurance policy, as shown in block 66. If the tenant has not defaulted under the terms and conditions of the insurance policy, the facilitator arrangement can deny the insurance claim of the insured party or otherwise refuse to remit a policy benefit to the insured party (e.g., buyer arrangement 12), as shown in block 68. Otherwise, if the tenant has defaulted under the terms and conditions of the insurance policy, the facilitator arrangement can determine a policy benefit payable to the insured party, also under the terms and conditions of the insurance policy, as shown in block 70. The policy benefit can be determined in any of a number of different manners in accordance with the terms and conditions of the insurance policy. In one typical embodiment, for example, the policy benefit can be determined based upon the rental income due the insured party from the defaulting tenant. For example, presume the insurance policy provides coverage of up to 15% of the NOI of the insured property. In such an instance, the policy benefit can be determined as 15% of the rental income due the insured party from the defaulting tenant under, less expenses incurred by the insured party in renting the respective portion of the property to the defaulting tenant. Alternatively, the policy benefit can be determined as 15% of the difference of the NOI of the property due the insured party with the defaulting tenant and the NOI without the defaulting tenant, where the NOI can be determined based upon the periodicity with which the defaulting tenant is due rent (e.g., monthly NOI of the insured property).

After determining the policy benefit, the facilitator arrangement 16 can remit the policy benefit to the insured party (e.g., buyer arrangement 12) under the terms and conditions of the policy, such as via check, bank draft, electronic wire transfer or the like, as shown in block 72. The method can then continue for the respective tenant, such as until the active time period of the policy expires or the portion of the insured property previously occupied by the respective defaulting tenant is occupied by a new tenant. In this regard, although the defaulting tenant may be evicted from the insured property, the tenant may still be considered in default and thus resulting in a loss of income. In continuing the method, the facilitator arrangement can repeatedly determine if the respective tenant remains in default under the terms and conditions of the policy (see block 64), such as with the same periodicity (e.g., monthly) with which the respective tenant paid rent. Additionally, the facilitator arrangement can repeatedly determine the policy benefit and/or remitting the policy benefit to the insured party, such as with the respective periodicity. In any event, however, the facilitator arrangement typically does not determine if the respective tenant is in default, determine or remit the policy benefit after the time period of the policy expires, or after the portion of the insured property previously occupied by the respective defaulting tenant is occupied by a new tenant.

As will be appreciated, the policy can be applied to more than one tenant of the insured property, if in accordance with the terms and conditions of the policy. More particularly, the insured property may include more than one tenant that at any given time during the time period of the policy, may default. For each tenant covered under the policy, then, the facilitator arrangement 16 can receive notification of the tenant default (see block 64), determine if the tenant has defaulted under the terms and conditions of the insurance policy (see block 66), and if the tenant has defaulted, determine and remit a policy benefit to the insured party (see blocks 70 and 72).

To further illustrate the benefits of the present invention, reference is now made to FIGS. 5–19, which illustrate exemplar displays, such as Web pages, capable of being provided by the facilitator arrangement 16 to the buyer arrangement 12 and/or seller arrangement. In this regard, the displays may be provided across the Internet (e.g., network 18), and thereafter presented by the respective arrangement for display to the buyer and/or seller. More particularly, as show in FIG. 5, the facilitator arrangement can provide a portal that can explain the service offered by the facilitator arrangement, and include a number of links to other displays that permit the buyer arrangement and/or seller arrangement to engage the service. For example, the display of FIG. 5 can include a link to "Seller Explanation," a "Buyer Explanation" and a "Program Qualifications" displays, which direct the facilitator arrangement to provide the displays of FIGS. 6, 7 and 8, respectively.

FIG. 6, then, illustrates a display that explains the service offered by the facilitator arrangement 16 to seller arrangements 14, and FIG. 7 illustrates a display that explains the service offered to buyer arrangements 12. FIG. 8, on the other hand, illustrates a display that explains the qualifications of the program or service, as well as that of seller arrangements and buyer arrangements participating in the program or service. In addition, the displays of FIGS. 6 and 7, as well as the portal display of FIG. 5, can include a link to permit a seller arrangement or a buyer arrangement to register with the facilitator arrangement, or more particularly with the service offered by the facilitator arrangement (see block 32 of FIG. 3A). Should a seller arrangement or buyer arrangement desire to register with the service, the seller arrangement or buyer arrangement can execute a respective link, which can direct the facilitator arrangement to provide the sign-up form displays of FIGS. 9 and 10, respectively. As shown in FIGS. 9 and 10, the seller arrangements and buyer arrangements can provide the facilitator arrangement with information regarding the properties of the sellers and/or the sellers themselves, or information regarding the buyers can be generated, gathered or otherwise received by the facilitator arrangement. As indicated above, after the facilitator arrangement 16 receives the buyer information or the seller information, the facilitator arrangement can evaluate the information to at least partially ensure that the buyers are legitimate and qualified to purchase an indicated level of real estate, or to allow the facilitator arrangement to provide data related to the properties of the sellers.

Figure 12:
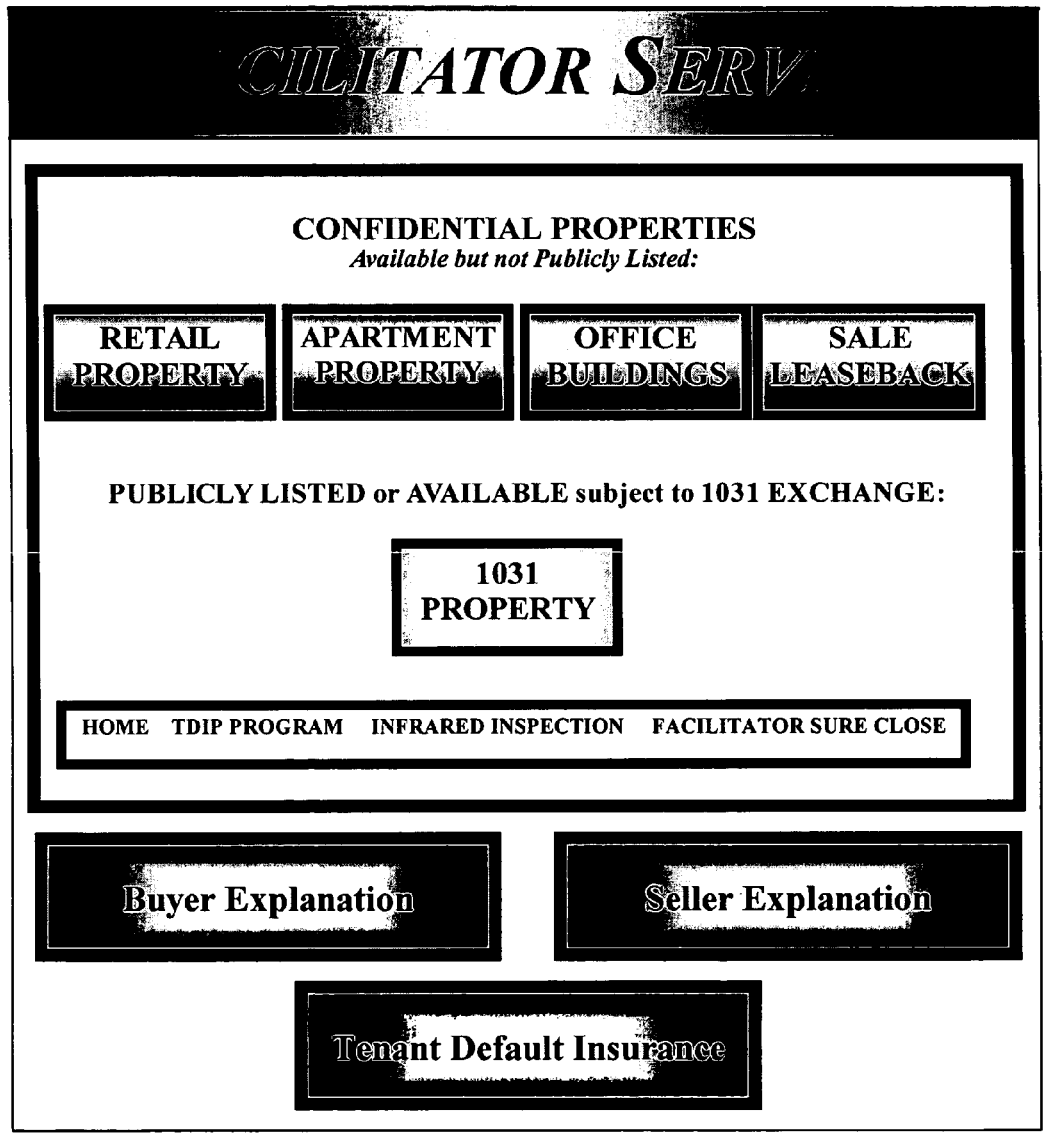
Figure 15:
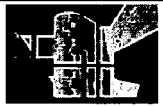

For buyer arrangements 12 and seller arrangements 14 registered with the service provided by the facilitator arrangement 16, as well as buyer and seller arrangements not registered with the service (if so desired), the facilitator arrangement provide listings of buyers and properties (see block 34 of FIG. 3A). More particularly, as shown in FIG. 11, the facilitator arrangement can provide a display of acquisition entities (i.e., buyers), including a portion of the buyer information stored in the buyer database, the buyer information being sufficient to allow sellers to gauge an interest in the buyers. As shown in FIG. 12, the facilitator arrangement can provide a portal to listings of confidential retail, apartment, office and sale-leaseback properties, as well as publicly listed or available properties subject to IRS 1031 tax deferred exchange. From the portal of listings (as well as the portal of FIG. 5), the facilitator arrangement can provide displays of retail properties (FIG. 13), apartment properties (FIG. 14), office properties (FIG. 15), sale-leaseback properties (FIG. 16) and/or 1031 properties (FIG. 17). Within each display, then, the facilitator arrangement can include a listing of respective properties, as well as a portion of the seller information stored in the property database, the portion of the information being sufficient to allow buyers to gauge an interest in the properties.

From the respective listings, the buyer arrangements 12 can identify properties of interest, and the sellers can identify buyer arrangements of interest (see block 36 of FIG. 3A). Then, as explained above, an initiating party (i.e., buyer or seller) desires to contact an initiated party (i.e., seller or buyer), the initiating party can receive from the facilitator arrangement 16, and thereafter execute, a the non-disclosure, non-circumvent facilitation agreement. Then, after the initiated party has accepted the agreement, the facilitator arrangement can provide, to the initiating party arrangement, confidential, access-restricted information related to the initiated party (see blocks 38–44 of FIG. 3A).

Once the initiating and initiated parties are engaged in communication, the parties can be restricted from contacting other parties (i.e., other sellers and buyers) for a predefined engagement period (e.g., five days). For example, the facilitator arrangement 16 can restrict access to the buyer arrangement 14 and the respective property of the seller arrangement 14 from the listings of buyers and properties. In this regard, the facilitator arrangement can restrict access to the buyer arrangement by blanking out the entry for the buyer in the display of buyers and identifying the buyer as being "Engaged," shown in FIG. 11. Similarly, the facilitator arrangement can restrict access to the respective property by blanking out the entry for the property in the display of properties and identifying the property as being "Engaged," shown in FIG. 12. As indicated above, by restricting each party from communicating with other parties during the engagement period, the facilitator arrangement call facilitate the parties concluding a real estate transaction with one another without outside interference.

After the initiating and initiated parties are engaged in communication, if the parties can conclude the real estate transaction for the respective property (see block 48), the facilitator can collect a predefined fee from the initiating party for the service provided by the facilitator (see blocks 50 and 52). Also at the conclusion of the transaction, if so desired and previously offered by the facilitator, the facilitator can provide the buyer with a limited duration tenant default insurance policy (see block 54). In this regard, as the buyer arrangements 12 and seller arrangements 14 engage the service offered by the facilitator arrangement 16, the facilitator arrangement can provide the buyer arrangements and seller arrangements with information regarding such a policy, as shown in the display of FIG. 18. And by providing such information, the facilitator arrangement can facilitate the buyer arrangements and seller arrangements registering with the service offered by the facilitator arrangement, and concluding a transaction while engaging the service.

As will be appreciated, the service of the facilitator arrangement 16 described herein can be provided in a number of different contexts relating to real estate, from commercial to residential real estate. It should be understood, however, that the service can generally be provided in any of a number of different contexts involving a buyer and a seller of a good. For example, the service can be provided by the facilitator arrangement in the context of an auction offering of a good by a seller to a number of buyers, such as in the context of an online auction (e.g., eBay).

Also, the tenant default insurance described herein can be provided in conjunction with a real estate transaction between a buyer arrangement 12 and a seller arrangement 14. It should be understood, however, that the tenant default insurance can be provided independent of such a transaction, without departing from the spirit and scope of the present invention. For example, the tenant default insurance can be provided to a buyer arrangement independent of the transaction between the buyer and a seller of a respective property. Alternatively, for example, the tenant default insurance can be provided to an owner of a property at any point during the ownership tenure of the owner. Also, it should be understood that the tenant default insurance car, also be provided in conjunction with other investment tools such as tenant-in-common ownership, REIT (real estate investment trust) ownership and/or IRS 1031 tax deferred exchange programs to create a new investment vehicle that offers a guarantee of a certain level of income to the new buyer during initial ownership, or during a period extending beyond initial ownership, if so provided by the facilitator arrangement.

According to one aspect of the present invention, all or a portion of the system of the present invention, such as all or portions of the buyer arrangement 12, seller arrangement 14 and/or facilitator arrangement 16, generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 3A, 3B and 4 are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the flowcharts.

Accordingly, blocks or steps of the control flow diagrams support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for facilitating a real estate transaction, the system comprising:
a facilitator arrangement for providing a service to at least one buyer arrangement and at least one seller arrangement, providing the service including providing information relating to at least one of at least one buyer arrangement or at least one seller arrangement, wherein one of the buyer arrangements or seller arrangements comprises an initiating party, and one of the other of the buyer arrangements or seller arrangements comprises an initiated party, the initiated party being selectable from the provided buyer information or seller information,
wherein the facilitator arrangement is adapted to engage the initiating party in communication with the initiated party regarding a property, the facilitator arrangement engaging the parties for an engagement period, and
wherein the facilitator arrangement is adapted to restrict the engaged parties from communicating with other parties during the engagement period to thereby facilitate the engaged parties concluding a real estate transaction regarding the property, the other parties comprising at least one of at least one other buyer arrangement or at least one other seller arrangement, restricting the engaged parties comprising at least one of restricting the other parties from accessing or removing, from the service, at least some information relating to at least one of the engaged parties.

2. A system according to claim 1, wherein the facilitator arrangement is adapted to provide at least one of information relating to at least one buyer arrangement in a buyer listing or information relating to at least one seller arrangement in a property listing, wherein the buyer listing includes at least one buyer arrangement, and the property listing includes at least one property of at least one seller arrangement, wherein one of the listings includes the initiating party and the other listing includes the initiated party, and
wherein the facilitator arrangement is adapted to receive a selection of an initiated party from one of the listings, the initiated party being selected by the initiating party, the facilitator arrangement being adapted to provide at least one of the listings and receiving a selection of the initiated party before engaging the parties in communication.

3. A system according to claim 2, wherein the facilitator arrangement is further adapted to provide access-restricted information to the initiating party, the access-restricted information being related to the initiated party and provided to the initiating party after the initiating party selects an initiated party.

4. A system according to claim 3, wherein the facilitator arrangement is further adapted to receive an executed agreement from the initiated party after the initiated party selects an initiated party, and wherein the facilitator arrangement is adapted to provide access-restricted information, engage the parties and restrict the engaged parties from communicating with other parties after receiving the executed agreement.

5. A system according to claim 2, wherein the facilitator arrangement is adapted to restrict the engaged parties from communicating by at least one of restricting access to the initiating party in the respective listing including the initiating party, or restricting access to the initiated party in the respective listing including the initiated party.

6. A system according to claim 1, wherein the facilitator arrangement is further adapted to register at least one buyer arrangement and at least one seller arrangement before engaging the parties, registering at least one buyer arrangement and at least one seller arrangement including registering the initiating party and the initiated party.

7. A system according to claim 6, wherein the facilitator arrangement is adapted to receive at least one piece of buyer information relating to the at least one buyer arrangement, evaluate the buyer information to determine if the at least one piece of buyer information is accurate, and to determine if the at least one buyer arrangement is qualified to purchase at least one property of at least one registered seller arrangement, and thereafter register the at least one buyer arrangement if the at least one piece of buyer information is accurate, and the at least one buyer arrangement is qualified.

8. A system according to claim 1, wherein the facilitator arrangement is adapted to engage the parties in communication regarding an income-producing property having at least one tenant, and wherein the facilitator arrangement is adapted to insure the buyer arrangement for a period of time against a loss of income due to a default of at least one tenant if the parties conclude a real estate transaction regarding the property.

9. A system according to claim 8, wherein the facilitator arrangement is adapted to insure the buyer arrangement by providing a policy to the buyer arrangement, determining if a tenant defaults under the policy, and if a tenant defaults, determining a policy benefit, and remitting the policy benefit to the buyer arrangement.

10. A system according to claim 1 further comprising the initiating party and the initiated party, wherein the initiating party and initiated party are adapted to conclude a real estate transaction regarding the property after being restricted from communicating with other parties.

11. A method for facilitating a real estate transaction, the method comprising:
   providing a service to at least one buyer arrangement and at least one seller arrangement, providing the service including providing information relating to at least one of at least one buyer arrangement or at least one seller arrangement, wherein one of the buyer arrangements or seller arrangements comprises an initiating party, and one of the other of the buyer arrangements or seller arrangements comprises an initiated party, the initiated party being selectable from the provided buyer information or seller information;
   engaging the initiating party in communication with the initiated party regarding a property, wherein engaging the parties comprises engaging the parties for an engagement period; and
   restricting the engaged parties from communicating with other parties during the engagement period to thereby facilitate the parties concluding a real estate transaction regarding the property, the other parties comprising at least one of at least one other buyer arrangement and at least one other seller arrangement, restricting the engaged parties comprising at least one of restricting the other parties from accessing or removing, from the service, at least some information relating to at least one of the engaged parties.

12. A method according to claim 11 further comprising:
   providing at least one of information relating to at least one buyer arrangement in a buyer listing and information relating to at least one seller arrangement in a property listing, wherein the buyer listing includes at least one buyer arrangement, and the property listing includes at least one property of at least one seller arrangement, wherein one of the listings includes the initiating party and the other listing includes the initiated party; and
   receiving a selection of an initiated party from one of the listings, the initiated party being selected by the initiating party,
   wherein providing at least one of the listings and receiving a selection of an initiated party occur before engaging the parties in communication.

13. A method according to claim 12 further comprising:
   providing access-restricted information to the initiating party, the access-restricted information being related to the initiated party and provided to the initiating party after the initiating party selects an initiated party.

14. A method according to claim 13 further comprising:
   receiving an executed agreement from the initiated party after the initiated party selects an initiated party,
   wherein providing access-restricted information, engaging the parties and restricting the engaged parties from communicating with other parties occur after receiving the executed agreement.

15. A method according to claim 12, wherein restricting the engaged parties from communicating comprises at least one of restricting access to the initiating party in the respective listing including the initiating party, or restricting access to the initiated party in the respective listing including the initiated party.

16. A method according to claim 11 further comprising:
   registering at least one buyer arrangement and at least one seller arrangement before engaging the parties, registering at least one buyer arrangement and at least one seller arrangement including registering the initiating party and the initiated party.

17. A method according to claim 16, wherein registering at least one buyer arrangement comprises:
   receiving at least one piece of buyer information relating to the at least one buyer arrangement;
   evaluating the buyer information to determine if the at least one piece of buyer information is accurate, and to determine if the at least one buyer arrangement is qualified to purchase at least one property of at least one registered seller arrangement; and
   registering the at least one buyer arrangement if the at least one piece of buyer information is accurate, and the at least one buyer arrangement is qualified.

18. A method according to claim 11, wherein engaging the parties comprises engaging the parties in communication regarding an income-producing property having at least one tenant, and wherein the method further comprises:
   insuring the buyer arrangement for a period of time against a loss of income due to a default of at least one tenant if the parties conclude a real estate transaction regarding the property.

19. A method according to claim 18, wherein insuring the buyer arrangement comprises:
   providing a policy to the buyer arrangement;
   determining if a tenant defaults under the policy, and if a tenant defaults,
   determining a policy benefit; and
   remitting the policy benefit to the buyer arrangement.

20. A method according to claim 11 further comprising:
   concluding a real estate transaction between the parties regarding the property after restricting the engaged parties from communicating with other parties.

21. A computer program product for facilitating a real estate transaction, the computer program product comprising at least one computer-readable storage medium having computer-readable program code portions stored therein, the computer-readable program code portions comprising:
   a first executable portion for providing a service to at least one buyer arrangement and at least one seller arrangement, providing the service including providing information relating to at least one of at least one buyer arrangement or at least one seller arrangement, wherein one of the buyer arrangements or seller arrangements comprises an initiating party, and one of the other of the buyer arrangements or seller arrangements comprises an initiated party, the initiated party being selectable from the provided buyer information or seller information;
   a second executable portion for engaging the initiating party in communication with the initiated party regarding a property; and a third executable portion for restricting the engaged parties from communicating with other parties during the engagement period to thereby facilitate the parties concluding a real estate transaction regarding the property, the other parties comprising at least one of at least one other buyer arrangement and at least one other seller arrangement, restricting the engaged parties comprising at least one of restricting the other parties from accessing or removing, from the service, at least some information relating to at least one of the engaged parties.

22. A computer program product according to claim 21 further comprising:
a fourth executable portion for providing at least one of information relating to at least one buyer arrangement in a buyer listing or information relating to at least one seller arrangement in a property listing, wherein the buyer listing includes at least one buyer arrangement, and the property listing includes at least one property of at least one seller arrangement, wherein one of the listings includes the initiating party and the other listing includes the initiated party; and
a fifth executable portion for receiving a selection of an initiated party from one of the listings, the initiated party being selected by the initiating party,
wherein the fourth and fifth executable portions are adapted to provide at least one of the listings and receive a selection of an initiated party, respectively, before the first executable portion engages the parties in communication.

23. A computer program product according to claim 22 further comprising:
a sixth executable portion for providing access-restricted information to the initiating party, the access-restricted information being related to the initiated party and provided to the initiating party after the initiated party selects an initiated party.

24. A computer program product according to claim 23 further comprising:
a seventh executable portion for receiving an executed agreement from the initiated party after the initiated party selects an initiated party,
wherein the sixth, second and third executable portions are adapted to provide access-restricted information, engage the parties and restrict the engaged parties from communicating with other parties, respectively, after the seventh executable portion receives the executed agreement.

25. A computer program product according to claim 22, wherein the third executable portion is adapted to at least one of restrict access to the initiating party in the respective listing including the initiating party, or restrict access to the initiated party in the respective listing including the initiated party.

26. A computer program product according to claim 21 further comprising:
a fourth executable portion for registering at least one buyer arrangement and at least one seller arrangement before engaging the parties, registering at least one buyer arrangement and at least one seller arrangement including registering the initiating party and the initiated party.

27. A computer program product according to claim 26, wherein the fourth executable portion is adapted to receive at least one piece of buyer information relating to the at least one buyer arrangement, at least partially evaluate the buyer information to determine if the at least one piece of buyer information is accurate, and to determine if the at least one buyer arrangement is qualified to purchase at least one property of at least one registered seller arrangement, and thereafter register the at least one buyer arrangement if the at least one piece of buyer information is accurate, and the at least one buyer arrangement is qualified.

28. A computer program product according to claim 21, wherein the second executable portion is adapted to engage the parties regarding an income-producing property having at least one tenant, and wherein the computer program product adapted for operation by a facilitator arrangement, the facilitator arrangement being adapted to insure the buyer arrangement for a period of time against a loss of income due to a default of at least one tenant if the parties conclude a real estate transaction regarding the property.

29. A computer program product according to claim 28, wherein the facilitator arrangement is adapted to provide a policy to the buyer arrangement, and wherein the computer program product further comprises:
a fourth executable portion for determining if a tenant defaults under the policy; and
a fifth executable portion for at least partially determining a policy benefit if a tenant defaults such that the facilitator arrangement is thereafter capable of remitting the policy benefit to the buyer arrangement.

* * * * *

UNITED STATES PATENT AND TRADEMARK OFFICE
CERTIFICATE OF CORRECTION

PATENT NO. : 7,152,037 B2  
APPLICATION NO. : 10/890548  
DATED : December 19, 2006  
INVENTOR(S) : Smith It is certified that error appears in the above-identified patent and that said Letters Patent is hereby corrected as shown below:

Column 4,

Line 39, "clement" should read --element--.

Column 8,

Line 41, after "provided" insert --by--.

Column 12,

Line 50, "show" should read --shown--.

Column 14,

Line 7, "call" should read --can--;

Line 50, "car" should read --can--.

Signed and Sealed this

Third Day of April, 2007

JON W. DUDAS  
*Director of the United States Patent and Trademark Office*